US012634702B2

(12) United States Patent
Farris et al.

(10) Patent No.: US 12,634,702 B2
(45) Date of Patent: May 19, 2026

(54) MOBILE AUTHENTICATION UTILIZING GEOFENCING

(71) Applicant: Bank of America Corporation, Charlotte, NC (US)

(72) Inventors: Taylor Farris, Hoboken, NJ (US); Jennifer Sanctis, Charlotte, NC (US); Jesse James Godley, Charlotte, NC (US); Trish Gillis, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 356 days.

(21) Appl. No.: 18/209,006

(22) Filed: Jun. 13, 2023

(65) Prior Publication Data
US 2024/0422551 A1 Dec. 19, 2024

(51) Int. Cl.
*H04W 12/64* (2021.01)
*H04W 12/06* (2021.01)
*H04W 12/104* (2021.01)

(52) U.S. Cl.
CPC ........... *H04W 12/64* (2021.01); *H04W 12/06* (2013.01); *H04W 12/104* (2021.01)

(58) Field of Classification Search
CPC .... H04W 12/64; H04W 12/06; H04W 12/104
See application file for complete search history.

(56) References Cited

U.S. PATENT DOCUMENTS

| | | | | |
|---|---|---|---|---|
| 9,510,196 B2 * | 11/2016 | Sensharma | ........... | H04W 12/06 |
| 2010/0192209 A1 * | 7/2010 | Steeves | ................... | H04L 63/08 726/7 |
| 2013/0124508 A1 * | 5/2013 | Paris | ....................... | G06F 16/51 707/723 |
| 2016/0127359 A1 * | 5/2016 | Minter | ................ | H04L 63/0861 726/6 |
| 2018/0181737 A1 * | 6/2018 | Tussy | ....................... | G06F 21/32 |
| 2018/0373858 A1 * | 12/2018 | Farkash | ................ | H04W 12/63 |
| 2019/0213316 A1 * | 7/2019 | Tussy | ..................... | G06V 40/45 |
| 2021/0350346 A1 * | 11/2021 | Edwards | .............. | G06V 40/174 |

* cited by examiner

*Primary Examiner* — Phy Anh T Vu
(74) *Attorney, Agent, or Firm* — Weiss & Arons LLP

(57) ABSTRACT

Provided herein is a method for verifying the identity and location of a putative user of a mobile computing device, including the steps of: photographing the user or a portion thereof with a first camera to generate a user image; photographing the environment with a second camera to generate an environmental image; transmitting the images to a remote receiver device associated with a remote processor; extracting a unit of image biometric information from the user image; comparing the unit of image biometric information to a stored unit of biometric information associated with the putative user's identity in a database of biometric information; and comparing the environmental image with a location image database, where the location image database includes images of known location.

16 Claims, 6 Drawing Sheets

700

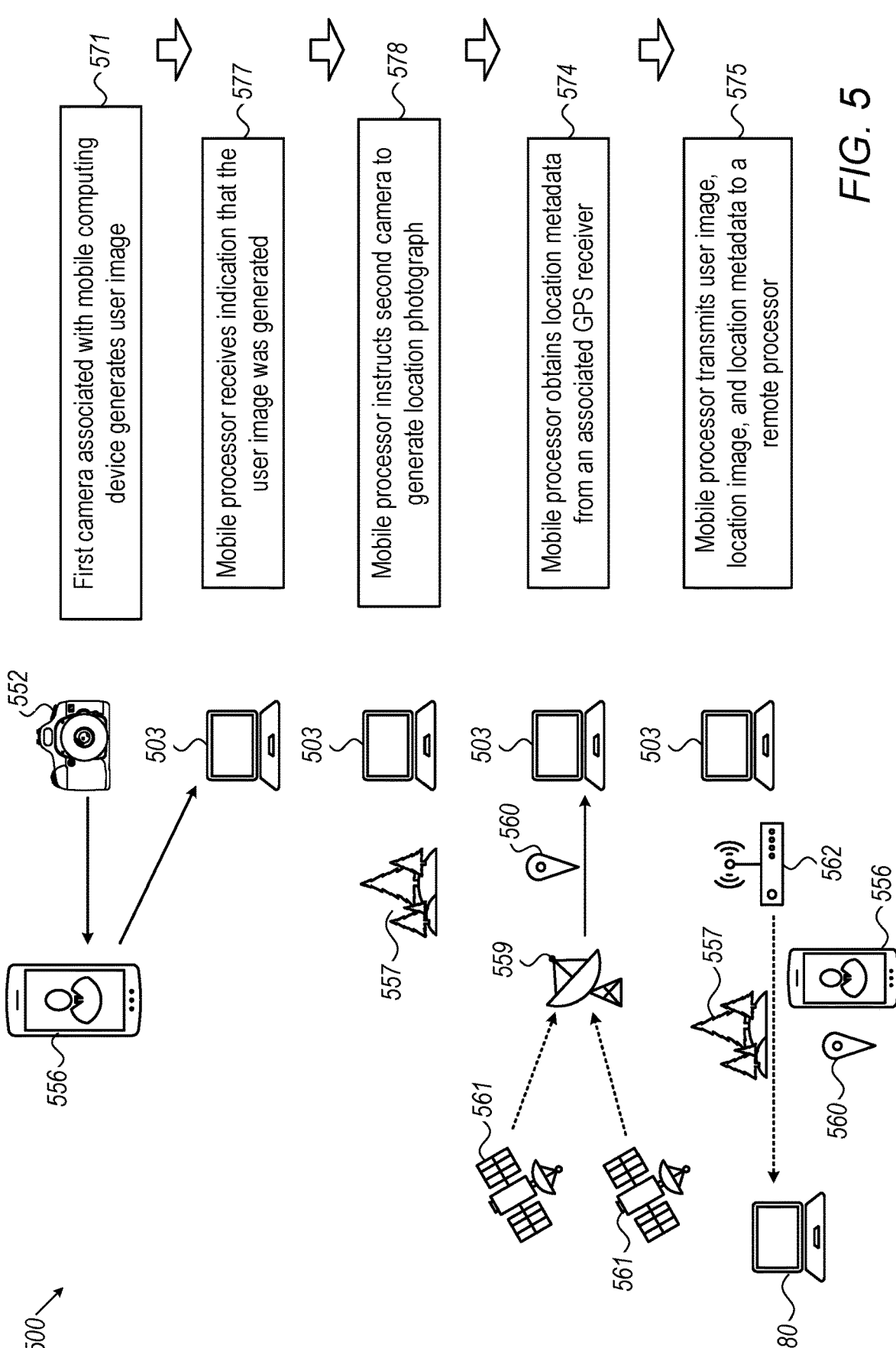

First camera associated with mobile computing device generates user image — 571

Mobile processor receives indication that the user image was generated — 577

Mobile processor instructs second camera to generate location photograph — 578

Mobile processor obtains location metadata from an associated GPS receiver — 574

Mobile processor transmits user image, location image, and location metadata to a remote processor — 575

FIG. 5

MOBILE AUTHENTICATION UTILIZING GEOFENCING

FIELD OF TECHNOLOGY

Aspects of the disclosure relate to methods of authenticating user locations.

BACKGROUND OF THE DISCLOSURE

Geolocation is the practice of determining the geographic location of an object or individual. Simultaneously verifying the identity and location of a mobile device user can add an additional layer of security in fraud prevention and verification of appropriate security clearance for various sensitive activities and computerized processes. Doing so can prevent, for example, misuse of mobile devices that have been stolen and/or breached in performing unauthorized financial transactions and accessing secure documents and sensitive areas.

SUMMARY OF THE DISCLOSURE

It is an object of this invention to develop automated protocols for verifying simultaneously the location and identity of a mobile device user.

It is a further object of this invention to enhance security measures surrounding sensitive sites and electronic transactions.

It is a further object of this invention to prevent fraud and security breaches caused by stolen and/or breaches mobile devices.

It is a further object of this invention to develop automated protocols for determining whether an individual is currently within a physical location in which that individual is trusted to perform certain activities.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically communicate with a remote processor and perform various other activities, as described herein.

A system or method in accordance with principles of the disclosure may facilitate real-time authentication of the identity and location of a putative user of a mobile computing device.

In some aspects, a system is provided for determining whether a user is located within a trusted geofenced area, in accordance with principles of the disclosure. The system may include a mobile computing device and a remote processor; where the mobile computing device in turn includes at least two cameras, a GPS (global positioning system) receiver and a mobile processor. The cameras may be configured to photograph images simultaneously.

A first camera associated with the mobile computing device may be configured to photograph a user or a portion thereof, thereby generating a user image.

A second camera associated with the mobile computing device may be configured to photograph, simultaneously with the first camera photographing the user or portion thereof, or soon thereafter, an environment of the user, thereby generating a location image. Reference herein to photographing an environment is intended, in some embodiments, to taking an image of any of the surroundings of a user's physical location. In some embodiments, the surroundings are outside a building. In other embodiments, the surroundings are inside a building.

The GPS receiver may be configured to (or, in other embodiments, effective to) provide location metadata associated with the mobile computing device. In certain embodiments, the location metadata is provided continuously by the GPS receiver.

The mobile processor may be configured to receive an indication that at least one of the user image and the location image (e.g., from the first camera and/or the second camera, respectively) was generated. The mobile processor may also be configured to communicate, immediately after receiving this indication, with the GPS receiver to collect and/or receive location metadata associated with the mobile device. The mobile processor may also be configured to transmit the user image, the location image, and the location metadata to a remote processor.

The remote processor may be configured to correlate, or compare, the location metadata with the data of a trusted geofenced area. The remote processor may also be configured to ascertain whether the user location indicated by the metadata falls within the trusted geofenced area. If/when this is the case, the remote processor may also be configured to instruct a transmitter device to transmit an indication to the mobile computing device that the user image was captured within the trusted geofenced area. The transmitter device may be associated with the remote processor.

As such, the present disclosure provides a technical solution to a technical problem of simultaneously verifying the identity and location of a mobile device user.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 5 depicts a method for determining whether a user of a mobile computing device is in a trusted geofenced area.

DETAILED DESCRIPTION OF THE DISCLOSURE

Figure 1:
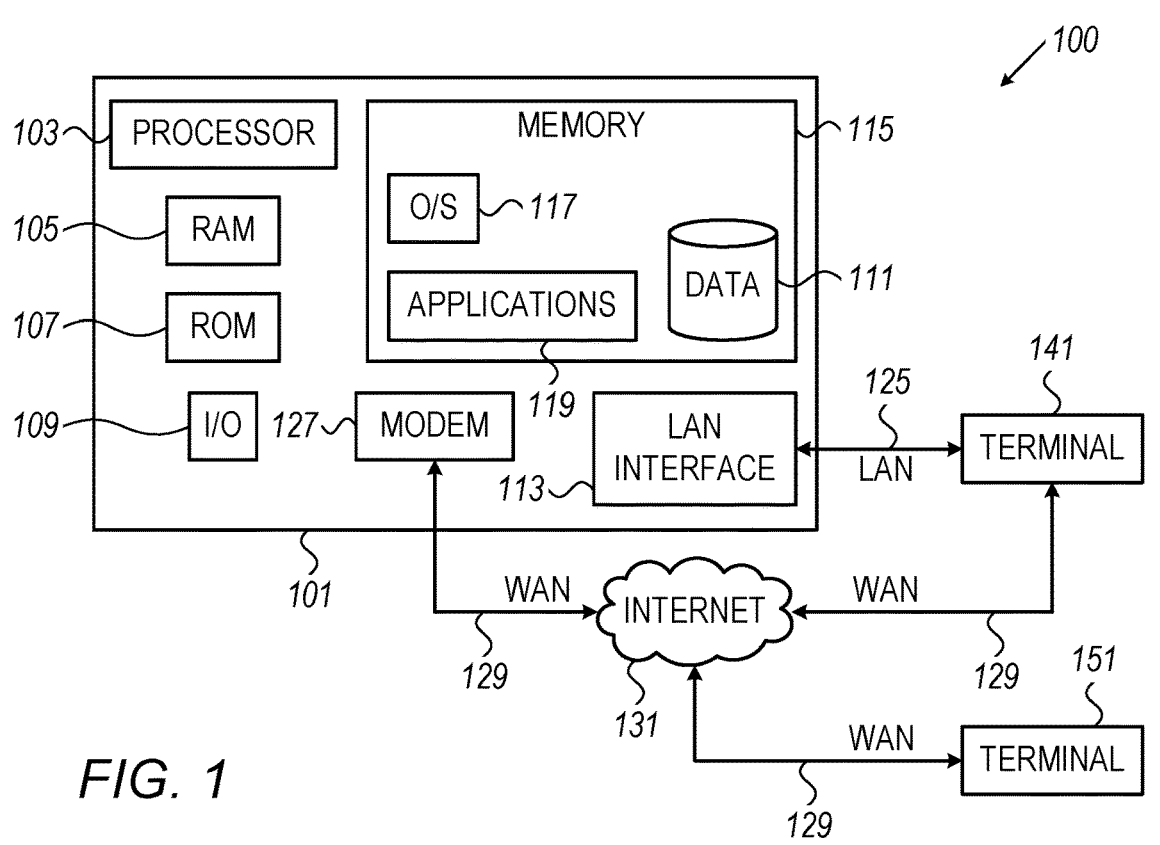
FIG. 1 shows an illustrative system in accordance with principles of the disclosure.

Systems and methods are described for leveraging mobile computing devices, and/or other complex, specific-use computer systems to provide a novel approach for verifying the identity and location of a user. The mobile devices may be smartphones and similar devices.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically direct processes performed by a mobile computing device and/or communicate information obtained from the processes to a remote processor.

In some embodiments, a system is provided for determining whether a user is located within a trusted geofenced area, in accordance with principles of the disclosure. The system may include a mobile computing device and a remote processor; where the mobile computing device in turn includes at least two cameras, a GPS (global positioning system) receiver and a mobile processor. The cameras may be configured to photograph images simultaneously, or within a short time of each other.

A first camera associated with the mobile computing device may be configured to photograph a user or a portion thereof, thereby generating a user image.

A second camera associated with the mobile computing device may be configured to photograph, simultaneously or soon thereafter with the first camera photographing the user or portion thereof, an environment of the user, thereby generating a location image. Reference herein to photographing an environment is intended, in some embodiments, to taking an image of any of the surroundings of a user's physical location. In some embodiments, the surroundings are outside a building. In other embodiments, the surroundings are inside a building.

Reference herein to a portion of a user (e.g., of a mobile computing device) may refer to a face, a torso, a retina, an iris, a fingerprint, or any other body part or portion useful in biometric recognition.

The GPS receiver may be configured to provide location metadata associated with the mobile computing device.

The mobile processor may be configured to receive an indication that at least one of the user image and the location image (e.g., from the first camera and/or the second camera, respectively) was generated. The mobile processor may also be configured to, immediately after receiving this indication, communicate with the GPS receiver to receive location metadata associated with the mobile device. In other embodiments, the processor communicates with the GPS receiver soon after receiving the indication that the image(s) was generated. The mobile processor may also be configured to transmit the user image, the location image, and the location metadata to a remote processor.

The remote processor may be configured to correlate, or compare, the location metadata with the data of a trusted geofenced area. The mobile processor may also be configured to, if the user location indicated by the metadata falls within the trusted geofenced area, instruct a transmitter device to transmit an indication to the mobile computing device that the user image was captured within the trusted geofenced area. The transmitter device may be associated with the remote processor.

Concurrent use of photographing an environmental image and obtaining location metadata may serve as a failsafe measure to deter unauthorized activities via intentional distortion of location-associated parameters associated with a mobile device. This can increase the difficulty for gaining entry to secure environments by hackers and unauthorized users.

Reference herein to correlating data (e.g., location metadata) with a particular area, or similar references, may denote determining whether the data is considered to represent, or correspond with, the location.

In some embodiments, the mobile processor may be further configured to extract a unit of image biometric information from the user image and transmit the unit of image biometric information to the mentioned remote processor. In some embodiments, the remote processor may be also configured to compare the unit of image biometric information to a stored unit of biometric information associated with the user's identity in a database of biometric information. In this manner, the user's identity can be confirmed.

Reference herein to a unit of image biometric information denotes one or more biometric characteristics that can be derived from an image of a person's body or a part thereof. Examples of such, provided solely for exemplification, include configurations of fingerprint ridges and valleys (e.g., arch, loop, and whorl), retinal vascularization patterns, and iris features.

In some embodiments, the mobile computing device also includes a third camera. The third camera may be configured to photograph an identity document, e.g., an identity document furnished by the user, thereby generating a document image. In further embodiments, the mobile processor may also be configured to transmit the document image to a remote processor.

Alternatively, or in addition, the remote may be configured to: (a) extract a unit of image biometric information from the user image; (b) extract a unit of document biometric information from the document image; and (c) compare the unit of image biometric information to the unit of document biometric information.

In some embodiments, if the user image was captured within the trusted geofenced area, and the user image matches the known biometric profile, then the system automatically confirms that the transaction request was performed by the trusted user within the trusted geofenced area.

In other embodiments, a method is provided for determining whether a user of a mobile computing device is in a trusted geofenced area, in accordance with principles of the disclosure. The method may utilize a mobile processor associated with the mobile computing device and one or more non-transitory computer-readable media storing computer-executable instructions. The instructions, when executed by the mobile processor, may obtain location metadata associated with the mobile computing device.

The method may include the optional step of receiving a location authentication request by a receiver device associated with the mobile computer device. The method may also include the step of photographing the user or a portion thereof with a first camera associated with the mobile computing device, thereby generating a user image. The method may also include the step of photographing the user's environment with a second camera associated with the mobile computing device, thereby generating a location image. This step may be executed simultaneously with the step of photographing the user or portion thereof, or, in other embodiments, soon thereafter. The method may also include the step of the mobile processor receiving an indication that the user image and/or the location image was generated. The method may also include the step of the mobile processor obtaining location metadata from a GPS (global positioning system) receiver associated with the mobile computing device. This step may be executed immediately after the previous step, or, in other embodiments, soon thereafter. The method may also include the step of the mobile processor transmitting the user image, the location image, and the location metadata to a remote processor. The mobile processor may execute this step by means of instructing a remote receiver device associated with the remote processor to transmit the mentioned information.

The method may also include the step of the remote processor correlating the location metadata with the trusted geofenced area. The method may also include the step of ascertaining whether the location metadata indicates that the user's location falls within the trusted geofenced area. If/when this is true, the method may include the step of the remote processor instructing a remote transmitter or transmitter device to transmit an indication to the mobile computing device that the user image was captured within the trusted geofenced area.

The described methods may further include the steps of the mobile processor instructing the GPS receiver to provide metadata to the mobile processor.

Regarding the mentioned indication that the user image and/or the location image was generated, indication that the user image was generated may emanate from the first camera. Similarly, indication that the location image was generated may emanate from the second camera.

In other embodiments, a method is provided for determining whether a user of a mobile computing device is in a trusted geofenced area, in accordance with principles of the disclosure. The method may utilize a mobile processor associated with the mobile computing device and one or more non-transitory computer-readable media storing computer-executable instructions. The instructions, when executed by the mobile processor, may obtain location metadata associated with the mobile computing device. The method may include the step of photographing the user or a portion thereof with a first camera associated with the mobile computing device, thereby generating a user image. The method may also include the step of receiving an indication that the user image was generated. The indication may be received by the mobile processor. The method may also include the step of directing a second camera associated with the mobile computing device to photograph the user's surroundings or environment, thereby generating a location image. The method may also include the step of directing a GPS receiver associated with the mobile computing device to obtain location metadata for the mobile device. The two steps mentioned immediately above-namely, directing the second camera to photograph the user's surroundings or environment, and directing the GPS receiver to obtain location metadata—may be directed by the mobile processor. These two steps may also be performed immediately after the step of receiving an indication that the user image was generated. In other embodiments, the aforementioned two steps are performed soon after the step of receiving an indication that the user image was generated. The method may also include the step of transmitting the user image, the location image, and the location metadata to a remote processor. The step of transmitting may be performed by, or directed by, the mobile processor. The user image, location image, and location metadata may be received by a remote receiver device associated with the remote processor.

The method may also include the step of the remote processor correlating the location metadata with the trusted geofenced area. The method may also include the step of ascertaining whether the location metadata indicates that the user's location falls within the trusted geofenced area. If/when this is the case, the method may also include the step of instructing a remote transmitter device to transmit an indication to the mobile computing device that the user image was captured within the trusted geofenced area. The step of instructing may be performed by the remote processor.

In certain embodiments, any of the aforementioned methods may also include the step of the mobile processor extracting a unit of image biometric information from the user image. Any of the aforementioned methods may also include the step of the mobile processor transmitting the unit of image biometric information to the remote processor.

In some embodiments, any of the aforementioned methods may also include the step of the remote processor comparing the unit of image biometric information to a stored unit of biometric information associated with the user's identity in a database of biometric information.

In some embodiments, any of the aforementioned methods may also include the step of photographing an identity document, thereby generating a document image. This step may be performed by a third camera associated with the mobile computing device.

Any of the aforementioned methods may also include the step of transmitting the document image to the remote processor. This step may be performed by the mobile processor.

In some embodiments, any of the aforementioned methods may also include the step of extracting a unit of image biometric information from the user image. This step may be performed by the remote processor. Any of the aforementioned methods may also include the step of extracting a unit of document biometric information from the document image. This step may be performed by the remote processor. Any of the aforementioned methods may also include the step of comparing the unit of image biometric information to the unit of document biometric information. This step may be performed by the remote processor.

By the aforementioned means, in some embodiments, the user's identity may be automatically authenticated.

Further provided herein is a method for verifying that a transaction request was performed by a trusted user within a trusted geofenced area, in accordance with principles of the disclosure. The method may include the step of confirming that the user image was captured within the trusted geofenced area, according to one of the previously described methods. The method may also include the step of confirming that the user image matches a known biometric profile of the user.

In some embodiments, the aforementioned confirmation steps are performed by a mobile processor. In other embodiments, the steps are performed by a remote processor.

In some embodiments, if the user image was captured within the trusted geofenced area, and the user image matches the known biometric profile, then the system automatically confirms that the transaction request was performed by the trusted user within the trusted geofenced area.

In other embodiments, a method is provided for verifying the identity and location of a putative user of a mobile computing device in a represented location, in accordance with principles of the disclosure. The method may utilize a mobile processor associated with the mobile computing device and one or more non-transitory computer-readable media storing computer-executable instructions. The instructions, when executed by the mobile processor, may transmit data to a remote processor.

The method may include the step of photographing the user or a portion thereof, thereby generating a user image. This step may be performed by a first camera associated with the mobile computing device.

The method may include the step of photographing the surroundings or environment of the mobile computing device, thereby generating an environmental image (which may be referred to as a "location image") of the user's physical surroundings. This step may be performed by a second camera. The camera may be a second camera associated with the mobile device.

The method may also include the step of transmitting the user image and environmental image to a remote receiver device associated with a remote processor. This step may be performed by a mobile transmitter. The mobile transmitted may be directed by the mobile processor.

The method may also include the step of extracting a unit of image biometric information from the user image. This step may be directed by the mobile processor.

In some embodiments, some of the aforementioned steps are directed by the remote processor. In other embodiments, all the aforementioned steps are directed by the remote processor.

In some embodiments, the steps of generating the user photograph and generating the user image and generating the environmental image are performed simultaneously. In other embodiments, the steps are performed nearly simultaneously or within a short time interval.

The method may further include the step of probing a database of biometric information with an identifier of the user to locate a stored unit of biometric information associated with the putative user's identity. The identify may be, for example, an account number or the like. This step may be directed by the remote processor.

The method may further include the step of comparing the unit of image biometric information to the stored unit of biometric information. This step may be directed by the remote processor.

The method may further include the step of probing a location image database with the environmental image, where the location image database includes images of known location. The location image database may include images with location information associated therewith. This step may be directed by the remote processor.

In some embodiments, the method also includes the steps of ascertaining whether the unit of image biometric information matches the stored unit of biometric information; and whether the environmental image matches at least one image of known location. If/when both of the above conditions are met, then the putative user is confirmed to be present in the matched location of known location.

Reference to a camera or other hardware associated with a mobile (computing) device refers, in some embodiments, to hardware integrated with the device.

In some embodiments, if the putative user is confirmed to be present in a location associated with the matching image, the remote processor instructs a remote transmitter or device to transmit an indication to the mobile computing device that the putative user is confirmed to be present in the matched location.

Alternatively or in addition, the described method may further include the step of photographing an identity document with a third camera, thereby generating a document image. This step may be performed by a third camera.

The method may further include the step of transmitting the document image to the remote receiver device. This step may be directed by the mobile processor.

The method may further include the step of extracting a unit of document biometric information from the document image. This step may be directed by the remote processor.

The method may further include the step of comparing the unit of image biometric information to the unit of document biometric information. This step may be directed by the remote processor.

In some embodiments of the described methods and systems, the mobile processor performs the steps of extracting and comparing the units of biometric information from the user image and/or the document image and probing the relevant databases with them.

Also provided herein is a method for verifying that a transaction request was performed by a user trusted at an associated location, in accordance with principles of the disclosure. The method may include the step of confirming an identity of the putative user and confirming a location of the putative user, according to any of the aforementioned methods. In some embodiments, if the putative user is confirmed to be a known user that is trusted in the matched location, then the transaction request was performed by a user trusted at an associated location.

In other embodiments, a method is provided for verifying the identity and location of a putative user of a mobile computing device in a putative location, in accordance with principles of the disclosure. The method may utilize a mobile processor associated with the mobile computing device and one or more non-transitory computer-readable media storing computer-executable instructions. The instructions, when executed by the mobile processor, may obtain location metadata associated with the mobile computing device.

The method may include the step of photographing the putative user or a portion thereof, thereby generating a user image. This step may be performed by a first camera associated with the mobile computing device.

The method may also include the step of photographing an environment of the mobile computing device, thereby generating an environmental image. This step may be performed by a second associated camera.

The method may also include the step of receiving an indication(s) that at least one of the photographs has been obtained. This step may be performed by the mobile processor.

The method may also include the step of obtaining location metadata from a GPS receiver associated with the mobile computing device. This step may be performed by the mobile processor. This step may be performed immediately after receiving indication(s) that at least one of the photographs has been obtained. In other embodiments, this step may be performed soon after receiving indication(s) that at least one of the photographs has been obtained.

The method may also include the step of transmitting the user image, the environmental image, and the location metadata to a remote processor. These items may be received by a remote receiver device associated with the remote processor. This step may be performed by the mobile processor. The step may be performed by a mobile transmitter associated with the mobile processor.

The method may also include the step of extracting a unit of image biometric information from the user image. This step may be performed by the remote processor.

The method may also include the step of comparing the image biometric information to a unit of biometric information stored in a database of biometric information in association with the putative user's identity. This step may be performed by the remote processor.

The method may also include the step of identifying a known location associated with the location metadata. This step may be performed by the remote processor.

In some embodiments of the described methods and systems, the mobile processor performs the step of extracting a unit of image biometric information from the user image.

In some embodiments, the aforementioned analyses may be performed by the remote processor.

In some embodiments, if the unit of image biometric information matches the stored unit of biometric information, then the putative user is confirmed to be present in the known location.

In some embodiments, the environmental image may be used to probe or query a location image database, where the location image database includes images of established locations. If a matching established location is identical or equivalent to the putative location, then additional verification is provided that the user is in the putative location. This analysis may be performed by the remote processor.

Reference herein to a test location being identical or equivalent to a putative location refers to the two locations matching one another or being sufficiently close to one another (e.g., within 5 meters of one another) that they are considered to match. In certain embodiments, the putative location of the mobile computing device is confirmed to be sufficiently close to the established location that the user is known to be within an area within which the user is trusted to perform the activity of interest.

In some embodiments, if the known location associated with the location metadata matches the putative location of the user, then the user is confirmed to be in the putative location.

In some embodiments, the environmental image may be compared to a location image database, where the location image database includes images of known locations. If a matching known location is identical or equivalent to the putative location, then additional confirmation (besides the location metadata match) is provided that the user is in the putative location.

In some embodiments of the described methods and systems, regarding the mentioned indication that the user image and/or the location image was generated, indication that the user image was generated may emanate from the first camera. Similarly, indication that the location image was generated may emanate from the second camera.

In some embodiments, the indication(s) receives the mobile processor is/are at least one of the following: (a) an indication from the first camera that the user image was generated; and (b) an indication from the second camera that the location image was generated. In some embodiments, the mobile processor receives both: (a) an indication from the first camera that the user image was generated; and (b) an indication from the second camera that the location image was generated.

In some embodiments, the aforementioned method may also include the step of photographing an identity document, thereby generating a document image. This step may be performed by a third camera associated with the mobile computing device.

The method may also include the step of transmitting the document image to the remote processor. This step may be performed by the mobile processor.

The aforementioned method may include still the step of extracting a unit of image biometric information from the user image. This step may performed by the remote processor.

The method may also include the step of extracting a unit of document biometric information from the document image. This step may performed by the remote processor.

The method may also include the step of comparing the unit of image biometric information to the unit of document biometric information. This step may performed by the remote processor.

In other embodiments, the aforementioned extracting steps are performed by the mobile processor.

Alternatively or in addition, any of the aforementioned methods may further include the step of obtaining an image time stamp associated with the user image. This step may performed by the mobile processor.

The method may also include the step of obtaining a location time stamp associated with the location metadata. This step may performed by the mobile processor.

The method may also include the step transmitting the image time stamp and the location time stamp to the remote processor. This step may performed by the mobile processor.

In some embodiments of the described methods and system, a time stamp is obtained from an internal timekeeping mechanism of the mobile computing device, instead of or in addition to the aforementioned time stamps. In some embodiments, the mobile processor compares the time stamps associated with the user image and with the location metadata. In some embodiments, the mobile processor compares the time stamp from the timekeeping mechanism to the time stamp(s) associated with the user image and/or with the location metadata. Alternatively or in addition, the mobile processor affixes time stamps to the user image and/or the location metadata. In some embodiments, the mobile processor also affixes a time stamp to the document image. In some embodiments, any of the mentioned time stamp(s) are compared to the current time by a remote processor that received the aforementioned information from a mobile processor.

In some embodiments, there is provided herein a method for verifying that a transaction request was performed by a user trusted within an associated location, in accordance with principles of the disclosure. The method may include the steps of confirming an identity of the putative user and a location of the putative user, according to any of the aforementioned methods. In some embodiments, if the putative user is confirmed to be a known user that is trusted in the associated location, then the transaction request was performed by a user trusted within an associated location.

In some embodiments of the described methods and systems, a mobile device user is prompted to simultaneously, or within a short time interval, photograph multiple items (for example, any 2 items selected from an image of the user or portion or body part thereof; an environmental image; and a document image). In some embodiments, the initial prompt may arise automatically, for example resulting from an attempt by the user to perform a transaction or other computerized operation or to gain entry into a secure area. Automatic prompts may be directed by a mobile processor. In other embodiments, the initial prompt may arise from a service center of a service provider, for example resulting from an attempt by the user to perform a transaction or other computerized operation or to enter a secure area. After a mobile processor receives an indication that the multiple items were photographed, the subsequent steps (as mentioned regarding the various methods and systems described herein) are performed.

In other embodiments, the user is prompted to photograph an individual item (for example, an image of the user or portion or body part thereof; an environmental image; or a document image). In some embodiments, the initial prompt may arise automatically, for example resulting from an attempt by the user to perform a transaction or other computerized operation or to gain entry into a secure area. Automatic prompts may be directed by a mobile processor. In other embodiments, the initial prompt may arise from a service center of a service provider, for example resulting from an attempt by the user to perform a transaction or other computerized operation or to enter a secure area. After a mobile processor receives an indication that the item was photographed, the processor directs the user to photograph additional items. In other embodiments, after a mobile processor receives an indication that the item was photographed, a service center directs the user to photograph additional items. After all required items are photographed, the subsequent steps (as mentioned regarding the various methods and systems described herein) are performed.

In some embodiments of the described methods and systems, the first and second camera angles may have any orientation relative to one another. In other embodiments, the first and second cameras have different orientation angles. In some embodiments, the first and second cameras have opposite orientation angles, i.e., approximately 180 degrees apart from one another. In some embodiments, the first and second camera lenses are on opposite faces of the mobile computing device. In some embodiments, the first and second camera lenses are on different faces (which are not necessarily opposite one another) of the mobile computing device.

Reference herein to simultaneously photographing multiple items (or performing other described acts) denotes, in some embodiments, to photographs obtained within 2 seconds of one another. Reference to acts performed within a short time interval, a second act performed "soon" after a first act, or similar language, refers to acts performed 2 minutes of one another. In other embodiments, the photographs are obtained within 1 minute, within 45 seconds, within 30 seconds, within 20 seconds, within 10 seconds, or within 5 seconds of one another.

Reference herein to immediate performance of a function denotes, in some embodiments, to performing the function within 2 minutes of the referenced action. In other embodiments, the function is performed within 1 minute, within 45 seconds, within 30 seconds, within 20 seconds, within 10 seconds, or within 5 seconds of the referenced action.

In some embodiments, any of the described methods are preceded by the additional step of receiving a location authentication request by a receiver device associated with the mobile computer device.

The aforementioned processing device or computer processor may be a computer, as described in more detail in FIG. 1, optionally including any of the components and elements described for FIG. 1.

Figure 2:
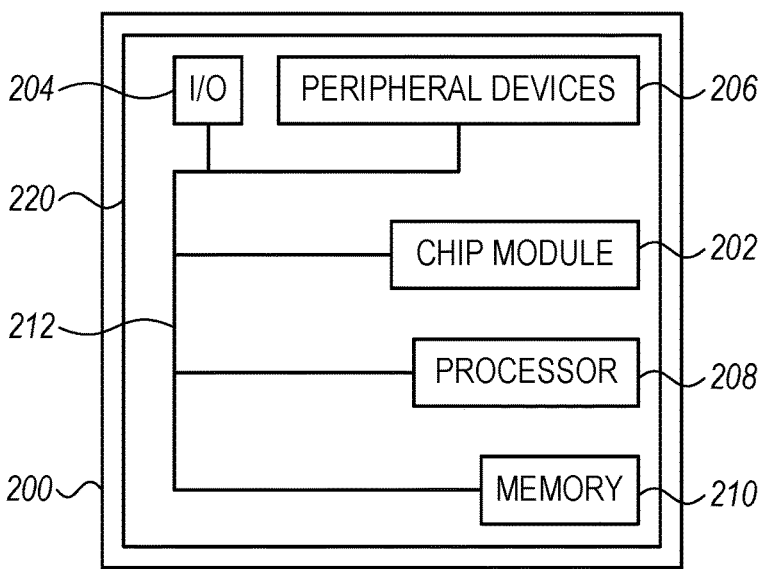
FIG. 2 shows an illustrative system in accordance with principles of the disclosure.

In some aspects, the processing device or computer processor may be a computer, as described in more detail in FIG. 2, optionally including any of the components and elements described for FIG. 2.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
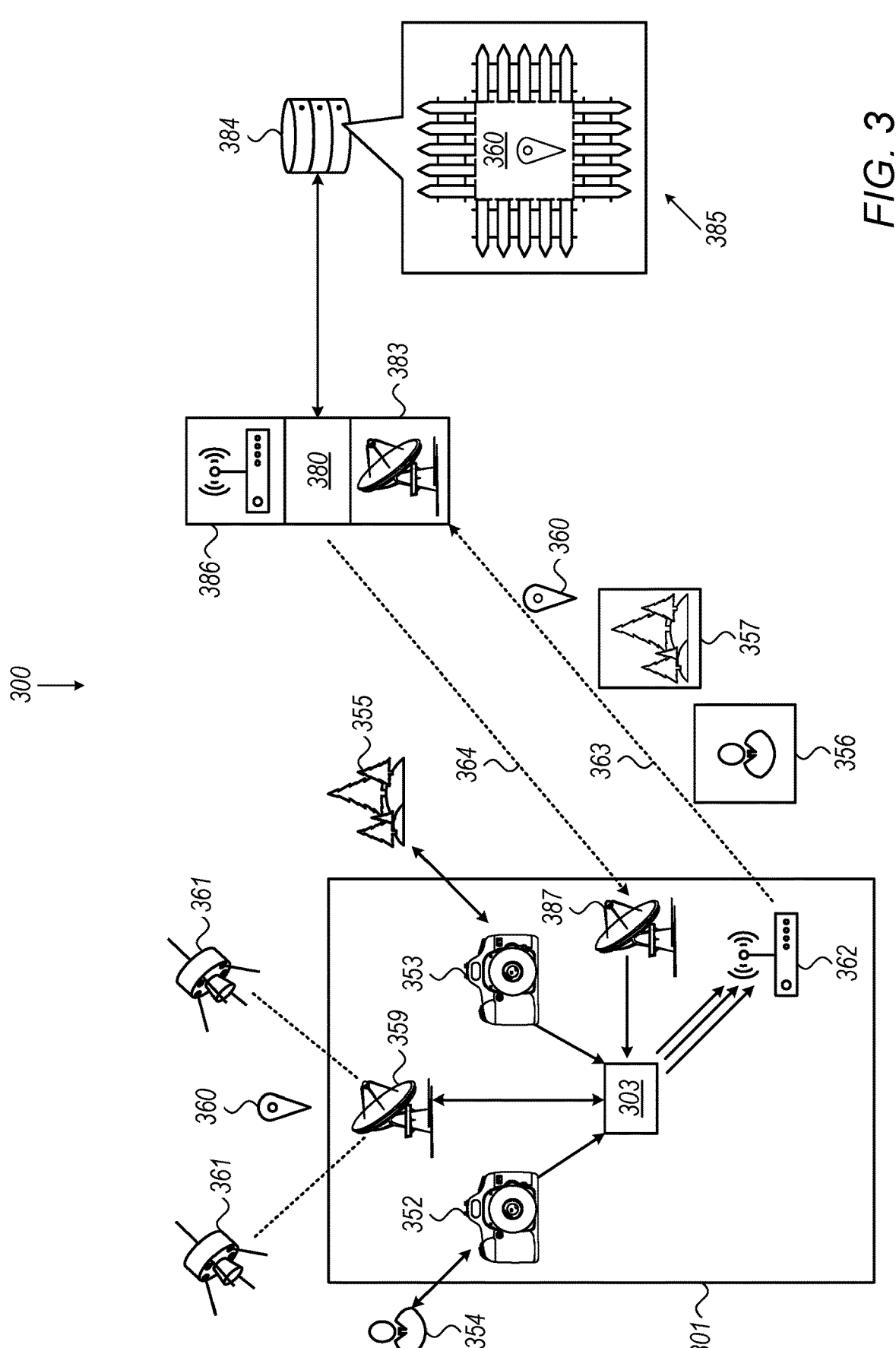
FIG. 3 depicts a system environment and information flow for a system for determining whether a user is located within a trusted geofenced area.

FIG. 3 depicts schematically a system environment and information flow 300 for a system for determining whether a user is located within a trusted geofenced area, in accordance with embodiments of the disclosure. The illustrative block diagram of system 300 includes mobile computing device 301 and remote processor 380. Mobile computing device 301 may include a first camera 352, the first camera 352 being configured to photograph a user 354 or a portion thereof, thus generating a user image 356; a second camera 353, the second camera 353 being configured to photograph, simultaneously with the act of photographing the user or portion thereof, or soon thereafter, an environment 355 of the user 354, thus generating a location image 357; a GPS receiver 359, configured to provide location metadata 360 (e.g., based on transmissions [triangulation] from satellites 361) associated with the mobile computing device; and a mobile processor 303. The mobile processor 303 may be configured to receive an indication that at least one of user image 356 and location image 357 was generated. The mobile processor may also be configured to communicate with GPS receiver 359 to receive location metadata 360. The mobile processor may perform the previously described step immediately after receiving this indication (that at least one of user image 356 and location image 357 was generated).

The mobile processor may also be configured to transmit, via an outgoing transmission 363 (e.g., via instructing mobile transmitter), user image 356, location image 357, and location metadata 360 to a remote processor 380.

The remote processor may be configured to receive outgoing transmission 363. Reception may be via remote receiver 383.

The remote processor may also be configured to correlate location metadata 360 with a trusted geofenced area 385. This step may be performed by querying a location database 384).

The remote processor may also be configured to ascertain whether location metadata 360 indicates a location within trusted geofenced area 385. If/when this is the case, the remote processor may also be configured to transmit an indication (e.g.,) to mobile computing device (which indication may be received by, e.g., mobile receiver 387); depicted as incoming transmission 364) that the user image was captured within the trusted geofenced area. Transmission may be via instructing a remote transmitter or transmitter device 386. The indication may be received by a mobile receiver (depicted as 387).

Figure 4:
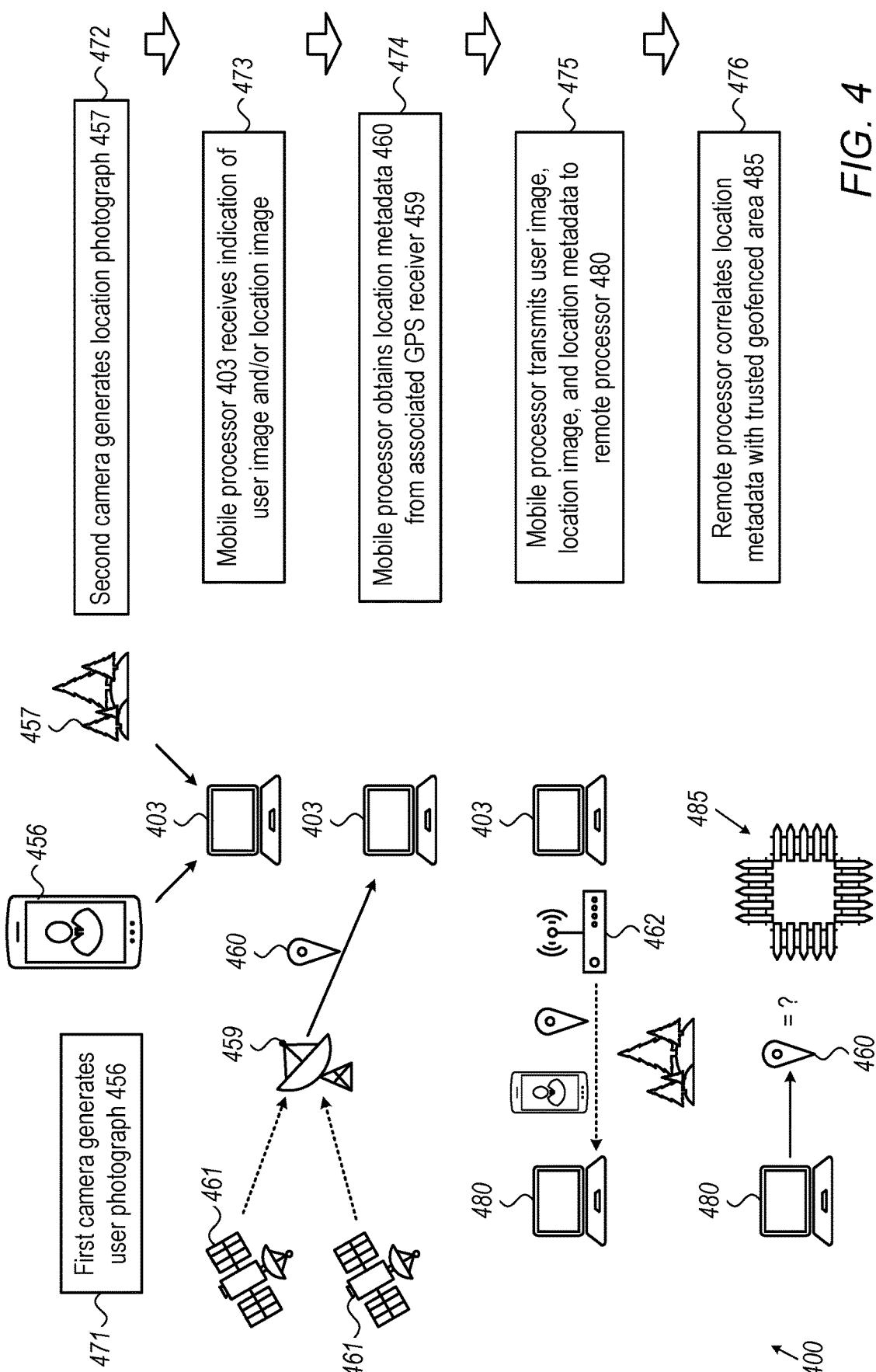
FIG. 4 depicts a method for determining whether a user of a mobile computing device (not depicted) is in a trusted geofenced area.

FIG. 4 is a schematic depiction of a method 400 for determining whether a user of a mobile computing device (not depicted) is in a trusted geofenced area, in accordance with embodiments of the disclosure. In step 471, a first camera (not depicted) associated with the mobile computing device generates a user photograph 456. In step 472, a second camera (not depicted) associated with the mobile computing device generates a location (or environmental) photograph 457. In some embodiments, steps 1A and 1B may be performed simultaneously, or within a short period of time of one another, in either order.

In step 473, a mobile processor 403 associated with the mobile computing device receives an indication that the user image and/or the location image was generated.

In step 474, the mobile processor obtains location metadata 460 from an associated GPS receiver 459. In some embodiments, the GPS receiver is in communication with satellites 461, which may transmit signals to the GPS receiver, which enable it to calculate the location metadata. In some embodiments, the described first and second cameras, mobile processor, and GPS receiver are all physically integrated into the mobile computing device. In other embodiments, the mentioned components are permanently attached to the mobile computing device.

In step 475, the mobile processor transmits the user image, location image, and location metadata to a remote processor 480. In some embodiments, the transmission is via a mobile transmitter 462 associated with the mobile computing device.

In step 476, the remote processor correlates or compares the location metadata with a trusted geofenced area.

FIG. 5 is a schematic depiction of a method 500 for determining whether a user of a mobile computing device (not depicted) is in a trusted geofenced area, in accordance with embodiments of the disclosure. In step 571, a first camera 552 associated with the mobile computing device generates a user image 556.

In step 577, a mobile processor 503 associated with the mobile computing device receives an indication that the user image was generated.

In step 578, the mobile processor instructs a second camera (not depicted) associated with the mobile computing device generates a location (or environmental) photograph 557.

In step 574, the mobile processor obtains location metadata 560 from an associated GPS receiver 559. In some embodiments, the GPS receiver is in communication with satellites 561, which may transmit signals to the GPS receiver, which enable it to calculate the location metadata.

In some embodiments, the described first and second cameras, mobile processor, and GPS receiver are all physically integrated into the mobile computing device.

In step 575, the mobile processor transmits the user image, location image, and location metadata to a remote processor 480. In some embodiments, the transmission is via a mobile transmitter 462 associated with the mobile computing device.

In the last step (not depicted), the remote processor correlates or compares the location metadata with a trusted geofenced area (similar to FIG. 4).

Figure 6:
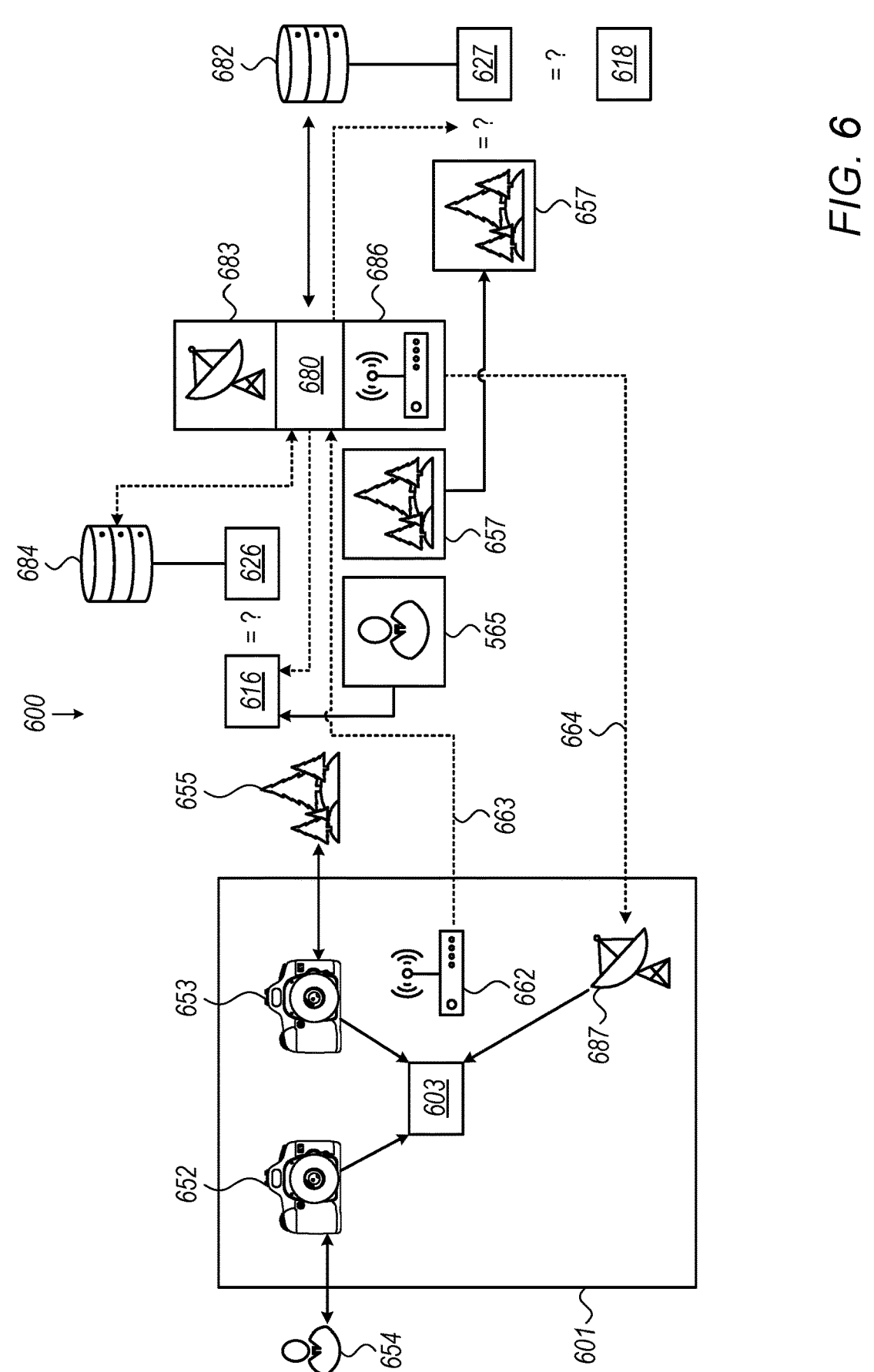
FIG. 6 depicts a system environment and information flow for verifying an identity and determining a location of a putative user of a mobile computing device.

FIG. 6 depicts schematically a system environment and information flow 600 for verifying an identity and determining a location of a putative user 654 of a mobile computing device 601, in accordance with embodiments of the disclosure.

The method may include the step of photographing the putative user or a portion thereof, thereby generating a user image. This step may be performed by a first camera 652 associated with the mobile computing device 656.

The method may also include the step of photographing the surroundings or environment 655 of the mobile computing device, thereby generating an environmental image 657 (which may be referred to as a "location image") of the user's physical surroundings 655. This step may be performed by a second camera 653. The second camera may be associated with the mobile device.

The method may also include the step of transmitting the user image and environmental image to a remote receiver device 683 associated with a remote processor 680; This step may be performed by a mobile transmitter 662. The mobile transmitted may be directed by a mobile processor 603 associated with the mobile computing device.

The method may also include the step of extracting a unit 616 of image biometric information from the user image. This step may be directed by the mobile processor.

In some embodiments, the remote processor probes or queries a database 684 of biometric information to identify a stored unit of biometric information 626 associated with the putative user's identity in the database; and the processor compares the unit of image biometric information with the stored unit of biometric information.

Alternatively or in addition, remote processor 680 probes a location image database 682 with the environmental image. The location image database may include a plurality of images with location information associated therewith.

In some embodiments, embodiments, if the unit of image biometric information matches the stored unit of biometric information; and the environmental image matches at least one matching image 627 among the images that have paired location information (such images and locations are hereinafter referred to as "paired images" and "paired locations", respectively), then the putative user is confirmed to be present in the location matched to the mentioned matching image.

In some embodiments, the putative user is trusted to perform a requested action, only when located in a specific trusted location(s) or area(s) 618. The putative user may have made a representation that he or she is located in the trusted location or area (or one of the trusted locations or areas, if there are multiple such locations or areas). In some embodiments, the remote processor compares matching image 627 to trusted location(s) or area(s) 618. If the matching image corresponds to the trusted location or area (or one of the trusted locations or areas, if relevant), and the putative user's identity has been confirmed, as described hereinabove, then the user can be trusted to perform the requested action.

In certain embodiments, remote processor 680 transmits to mobile processor 603 an indication that the user can be trusted to perform the requested action. This may be, e.g., a transmission from a remote transmitter 686 to a mobile receiver device 687 associated with the mobile computing device. The transmission is depicted in FIG. 6 as incoming transmission 664.

Figure 7:
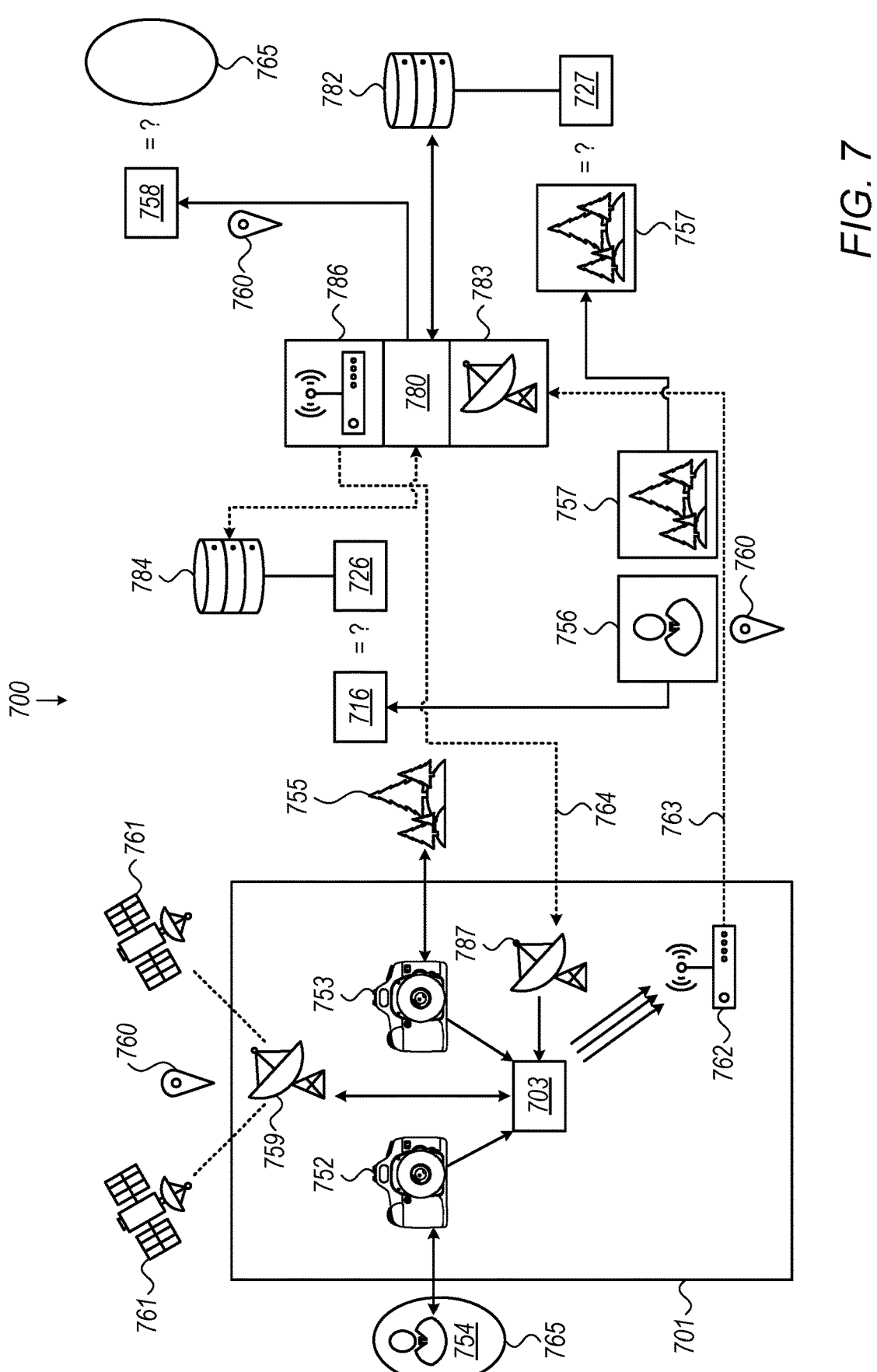
FIG. 7 depicts a system environment and information flow for a method for verifying an identity and location of a putative user of a mobile computing device in a putative location.

FIG. 7 depicts a system environment and information flow for a method 700 for verifying an identity and location of a putative user 754 of a mobile computing device 701 in a putative location 765, the method utilizing a mobile processor 703 associated with the mobile computing device and one or more non-transitory computer-readable media storing computer-executable instructions. The instructions, when executed by the mobile processor, may obtain location metadata 760 associated with the mobile computing device.

The method may include the step of photographing the putative user 754 or a portion thereof, thereby generating a user image 756. This step may be performed by a first camera 752 associated with the mobile computing device.

The method may also include the step of photographing an environment 755 of the mobile computing device, thereby generating an environmental image 757. This step may be performed by a second camera 753 associated with the mobile computing device.

The method may also include the step of receiving an indication from the first camera that the user image was generated; and/or an indication from the second camera that the location image was generated. This step may be performed by the mobile processor.

The method may also include the step of obtaining the location metadata 760 from a GPS (global positioning system) receiver 759 associated with the mobile computing device. This step may be performed immediately after receiving the described indication(s) from the first and/or second camera. In other embodiments, this step may be performed soon after receiving the indication(s). This step may be performed by the mobile processor.

The method may also include the step of transmitting the user image, the environmental image, and the location metadata to a remote receiver device 783 associated with a remote processor 780. This step may be performed by the mobile processor. The mobile processor may instruct a mobile transmitter 762 associated with the mobile processor to transmit the information.

The method may also include the step of extracting a unit of image biometric information 716 from the user image. This step may be performed by the remote processor.

The method may also include the step of probing a database 784 of biometric information to identify a stored unit of biometric information 726 associated with the putative user's identity in the database of biometric information. The method may also include the step of comparing the unit of image biometric information 716 with the stored unit of biometric information 726. These steps may be performed by the remote processor.

The method may also include the steps of identifying a known location 758 associated with the location metadata; and determining whether the known location is identical or equivalent to the putative location 765. These steps may be performed by the remote processor.

In some embodiments, if the unit of image biometric information matches the stored unit of biometric information, and the known location is identical or equivalent to the putative location, then the putative user's identity and location are confirmed.

In some embodiments, GPS receiver 759 obtains the location metadata 760 from satellites 761, e.g., via triangulation of signals (depicted as dotted lines) from the satellites.

Optionally, remote processor 780 may also probes a location image database 782 with environmental image 757. The location image database may include a plurality of images (not depicted) with location information associated therewith.

In some embodiments, embodiments, if environmental image 757 matches at least one matching image 727 among the paired images (namely, images that have a paired location), and the location of the matching image is identical or equivalent to the putative location, then additional confirmation has been provided that the user is present in the putative location.

In some embodiments, remote processor 780 sends a notification to mobile transmitter 703 of confirmation of the putative user's identity and location. This may be from a remote transmitter or transmitter device 786 associated with the remote processor 780 and/or to a mobile receiver device 787. The incoming transmission is depicted in FIG. 7 as dotted line 764.

In some embodiments of the aforementioned methods and systems, a geofence is a location-based service in which an application or other software that supports a GPS, Bluetooth, Wi-Fi, or cellular data can determine when a mobile device or RFID tag enters or exits a virtual boundary set up around a geographical location, such as a virtual boundary delineating an area within which a user is trusted to perform a particular activity.

In certain embodiments, when a user is determined to be at a trusted location or within a trusted area, additional authentication requirements can be relaxed. Conversely, if the user is outside the trusted location or area, more stringent authentication requirements are imposed by the network or system.

In some embodiments of the aforementioned methods and systems, a first photograph is taken by user (e.g., in response to a prompt from a mobile phone application or a service center representative), and the processor of the mobile computing device automatically takes the second (and, in some embodiments the third) photograph. In other embodiments, the first and second photographs are taken by the user (e.g., in response to prompts from a mobile phone application or a service center representative), and the processor of the mobile computing device automatically continues the subsequent steps (see, for example, the differences between FIGS. 4 and 5 in this regard).

In some embodiments of the aforementioned methods and systems, location metadata obtained by a GPS receiver reflects a spatial position of the mobile computer device, which is expressed, in some embodiments, as spatial latitude/longitude coordinates. In certain embodiments, the metadata indicates the position at which the positioning data was generated.

The described methods and systems may be used to authenticate or authorize a user to perform particular actions. In certain embodiments, examples of such actions are financial transactions, military operations, and access to information for which security clearance is required.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random-access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized. The regulated ML model is designed to make incremental learning adjustments in tandem with the determinations made by the machine learning engine and communicated to the regulated ML model. The machine learning engine accesses data outputted from user verification attempts, and it is trained to use data from the test verification attempts to collectively formulate and approve incremental learning adjustments with the regulated ML model. The regulated ML model and the machine learning engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products may improve and optimize methods and systems for simultaneously verifying the identity and location of a mobile computing device user. Persons skilled in the art will appreciate that the present invention can be practiced by other than the described embodiments, which are presented for purposes of illustration rather than of limitation.

What is claimed is:

1. A system for determining whether a user is located within a trusted geofenced area, said system comprising a mobile computing device and a remote processor, said mobile computing device comprising:

a first camera, said first camera being configured to:
photograph the user or a portion thereof, thereby generating a user image; and
transmit a first indication that the user image was generated;

a second camera, said second camera being configured to:
photograph, simultaneously with said first camera photographing said user or portion thereof, or soon thereafter, an environment of said user, thereby generating a location image; and
transmit a second indication that the location image was generated;

a GPS (global positioning system) receiver, configured to continuously provide location metadata associated with said mobile computing device; and a mobile processor, wherein said mobile processor is configured to:

prompt the mobile computing device to simultaneously photograph at least one of said user image and said location image;

receive at least one of said first indication and said second indication;

immediately after receiving at least one of said first indication and said second indication, communicate with said GPS receiver to receive said location metadata;

continuously receive location metadata from the GPS receiver; and transmit said user image, said location image, and said location metadata to a remote processor, wherein said remote processor is configured to:

correlate said location metadata with said trusted geofenced area; and if said location metadata indicates a location within said trusted geofenced area, instruct a remote transmitter to transmit a third indication to said mobile computing device that said user image was captured within said trusted geofenced area.

2. The system of claim 1, wherein said mobile processor is further configured to:

extract a unit of image biometric information from said user image; and transmit said unit of image biometric information to said remote processor.

3. The system of claim 2, wherein said remote processor is further configured to compare said unit of image biometric information to a stored unit of biometric information associated with an identity of said user in a database of biometric information.

4. The system of claim 1, said mobile computing device further comprising a third camera, said third camera being configured to photograph an identity document, thereby generating a document image; and wherein said mobile processor is further configured to transmit said document image to a remote processor.

5. The system of claim 4, wherein said remote processor is configured to: (a) extract a unit of image biometric information from said user image; (b) extract a unit of document biometric information from said document image; and (c) compare said unit of image biometric information to said unit of document biometric information.

6. A method for determining whether a user of a mobile computing device is in a trusted geofenced area, the method utilizing a mobile processor associated with said mobile computing device and one or more non-transitory computer-readable media storing computer-executable instructions, wherein the instructions, when executed by the mobile processor, obtain location metadata associated with said mobile computing device, said method comprising the steps of:

prompting the mobile computing device to simultaneously photograph at least one of a user image and a location image;

photographing said user or a portion thereof with a first camera associated with said mobile computing device, thereby generating said user image;

transmitting from said mobile computing device a first indication that said user image was generated;

simultaneously with said photographing said user or portion thereof, or soon thereafter, photographing an environment with a second camera associated with said mobile computing device, thereby generating said location image;

transmitting from said mobile computing device a second indication that said location image was generated;

said mobile processor receiving at least one of:
said first indication; or
said second indication;

immediately after receiving said indication(s), said mobile processor continuously obtaining said location metadata from a GPS (global positioning system) receiver associated with said mobile computing device;

said mobile processor transmitting said user image, said location image, and said location metadata to a remote receiver device associated with a remote processor;

said remote processor correlating said location metadata with said trusted geofenced area; and if said location metadata indicates a user location within said trusted geofenced area, said remote processor instructing a remote transmitter to transmit a third indication to said mobile computing device that said user image was captured within said trusted geofenced area.

7. The method of claim 6, said method further comprising the steps of:

said mobile processor extracting a unit of image biometric information from said user image; and said mobile processor transmitting said unit of image biometric information to said remote processor.

8. The method of claim 7, said method further comprising the step of said remote processor comparing said unit of image biometric information to a stored unit of biometric information associated with an identity of said user in a database of biometric information.

9. The method of claim 6, said method further comprising the steps of:

a third camera associated with said mobile computing device photographing an identity document, thereby generating a document image; and said mobile processor transmitting said document image to said remote processor.

10. The method of claim 9, further comprising the steps of:

said remote processor extracting a unit of image biometric information from said user image;

said remote processor extracting a unit of document biometric information from said document image; and said remote processor comparing said unit of image biometric information to said unit of document biometric information.

11. A method for verifying an identity and location of a putative user of a mobile computing device in a putative location, the method utilizing a mobile processor associated with said mobile computing device and one or more non-transitory computer-readable media storing computer-executable instructions, wherein the instructions, when executed by the mobile processor, obtain location metadata associated with said mobile computing device, said method comprising the steps of:

prompting said mobile computing device to simultaneously photograph at least one of a user image and an environmental image;

photographing said putative user or a portion thereof with a first camera associated with said mobile computing device, thereby generating said user image;

transmitting from said mobile computing device a first indication that said user image was generated;

photographing an environment of said mobile computing device with a second camera associated with said mobile computing device, thereby generating said environmental image;

transmitting from said mobile computing device a second indication that said environmental image was generated;

said mobile processor receiving at least one of:

said first indication; or said second indication;

immediately after receiving said indication(s), said mobile processor continuously obtaining said location metadata from a GPS (global positioning system) receiver associated with said mobile computing device;

said mobile processor transmitting said user image, said environmental image, and said location metadata to a remote receiver device associated with a remote processor;

said remote processor extracting a unit of image biometric information from said user image;

said remote processor probing a database of biometric information to identify a stored unit of biometric information associated with an identity of said putative user in said database of biometric information; and comparing said unit of image biometric information with said stored unit of biometric information; and said remote processor identifying a known location associated with said location metadata and determining whether said known location is identical or equivalent to said putative location, wherein, if said unit of image biometric information matches said stored unit of biometric information, and said known location is identical or equivalent to said putative location, then said identity and location are confirmed.

12. The method of claim 11, said method further comprising the steps of:

a third camera associated with said mobile computing device photographing an identity document, thereby generating a document image; and said mobile processor transmitting said document image to said remote processor.

13. The method of claim 12, further comprising the steps of:

said remote processor extracting a unit of image biometric information from said user image;

said remote processor extracting a unit of document biometric information from said document image; and said remote processor comparing said unit of image biometric information to said unit of document biometric information.

14. The method of claim 11, said method further comprising the steps of:

said mobile processor obtaining an image time stamp associated with said user image;

said mobile processor obtaining a location time stamp associated with said location metadata; and said mobile processor transmitting said image time stamp and said location time stamp to said remote processor.

15. The method of claim 11, said method further comprising the step of said remote processor probing a location image database with said environmental image, said location image database comprising a plurality of images with location information associated therewith.

16. A method for verifying that a transaction request was performed by a user trusted within an associated location, said method comprising the steps of confirming an identity of said putative user and a location of said putative user the method comprising:

prompting said mobile computing device to simultaneously photograph at least of a user image and an environmental image;

photographing said putative user or a portion thereof with a first camera associated with said mobile computing device, thereby generating said user image;

transmitting from said mobile computing device a first indication that said user image was generated;

photographing an environment of said mobile computing device with a second camera associated with said mobile computing device, thereby generating said environmental image;

transmitting from said mobile computing device a second indication that said environmental image was generated;

said mobile processor receiving at least one of:

said first indication; or said second indication;

immediately after receiving said indication(s), said mobile processor continuously obtaining said location metadata from a GPS (global positioning system) receiver associated with said mobile computing device;

said mobile processor transmitting said user image, said environmental image, and said location metadata to a remote receiver device associated with a remote processor;

said remote processor extracting a unit of image biometric information from said user image;

said remote processor probing a database of biometric information to identify a stored unit of biometric information associated with an identity of said putative user
in said database of biometric information; and compar-
ing said unit of image biometric information with said
stored unit of biometric information; and said remote processor identifying a known location associated with said location metadata and determining
whether said known location is identical or equivalent
to said putative location;

whereby, if said putative user is confirmed to be a known
user that is trusted in said known location, then said
transaction request was performed by a user trusted
within an associated location.

\* \* \* \* \*